US012762615B2

(12) United States Patent
Stanisljevic et al.

(10) Patent No.: US 12,762,615 B2
(45) Date of Patent: Oct. 13, 2026

(54) SYSTEMS AND METHODS FOR CONTINUOUS EVALUATION OF CUSTOMER CREDIT

(71) Applicant: Wells Fargo Bank, N.A., San Francisco, CA (US)

(72) Inventors: Zoran Stanisljevic, Mint Hill, NC (US); Cecil B. Burrowes, Charlotte, NC (US); Debashis Ghosh, Charlotte, NC (US); Nadia Van De Walle, Wayne, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 102 days.

(21) Appl. No.: 18/303,420

(22) Filed: Apr. 19, 2023

(65) Prior Publication Data

US 2024/0354845 A1 Oct. 24, 2024

(51) Int. Cl.
*G06Q 40/03* (2023.01)
*G06Q 10/04* (2023.01)
*G06Q 10/0635* (2023.01)

(52) U.S. Cl.
CPC ............ *G06Q 40/03* (2023.01); *G06Q 10/04* (2013.01); *G06Q 10/0635* (2013.01)

(58) Field of Classification Search
None
See application file for complete search history.

(56) References Cited

U.S. PATENT DOCUMENTS

| | | | | |
|---|---|---|---|---|
| 7,702,563 | B2 * | 4/2010 | Balson | G06Q 40/06 705/37 |
| 7,814,005 | B2 * | 10/2010 | Imrey | G06Q 40/00 705/38 |
| 8,386,377 | B1 | 2/2013 | Xiong | |
| 8,694,420 | B1 | 4/2014 | Oliai | |
| 8,825,530 | B2 | 9/2014 | Miller | |

(Continued)

FOREIGN PATENT DOCUMENTS

JP 2006099316 A 4/2006

OTHER PUBLICATIONS

American Express Credit Passport by Nova Credit brochure, Amex US, https://www.americanexpress.com/us/credit-cards/features-benefits/us-newcomers/, 2022.

*Primary Examiner* — William J Jacob
(74) *Attorney, Agent, or Firm* — K&L Gates LLP

(57) ABSTRACT

Systems, apparatuses, methods, and computer program products are disclosed for continuous evaluation of customer credit. An example method includes receiving, by communications hardware, historical customer financial data, and generating, by user profile circuitry and based on the historical customer financial data, a user credit profile. The example method further includes receiving, by the communications hardware, real-time customer financial data, and updating, by the user profile circuitry and based on the real-time customer financial data, the user credit profile. The example method further includes receiving, by the communications hardware and from a server device, a request for credit data, wherein the credit data is based on the user credit profile, and transmitting, by the communications hardware, the credit data to the server device.

20 Claims, 8 Drawing Sheets

(56) References Cited

U.S. PATENT DOCUMENTS

| | | | | |
|---|---|---|---|---|
| 9,590,980 | B2 | 3/2017 | Boss et al. | |
| 9,760,697 | B1 | 9/2017 | Walker | |
| 9,760,871 | B1 | 9/2017 | Pourfallah | |
| 9,830,591 | B2 | 11/2017 | Pruthi et al. | |
| 9,984,252 | B2 | 5/2018 | Pollard | |
| 10,157,421 | B2 | 12/2018 | Sheng et al. | |
| 10,740,735 | B2 | 8/2020 | Malhotra | |
| 11,687,896 | B2 | 6/2023 | Brennan | |
| 11,900,451 | B1 * | 2/2024 | King | G06Q 40/0631 |
| 2003/0080185 | A1 | 5/2003 | Werther | |
| 2008/0052182 | A1 | 2/2008 | Marshall | |
| 2008/0071556 | A1 | 3/2008 | Cina et al. | |
| 2008/0288401 | A1 | 11/2008 | Jones | |
| 2010/0010930 | A1 * | 1/2010 | Allen | G06Q 40/00 705/38 |
| 2010/0257095 | A1 | 10/2010 | Porterfield | |
| 2012/0136781 | A1 | 5/2012 | Fridman | |
| 2013/0046687 | A1 | 2/2013 | Simpson, Jr. | |
| 2013/0346173 | A1 | 12/2013 | Chandoor | |
| 2015/0371326 | A1 | 12/2015 | Montesano | |
| 2016/0055583 | A1 | 2/2016 | Liberty et al. | |
| 2017/0069021 | A1 * | 3/2017 | King | G06Q 40/12 |
| 2017/0076382 | A1 | 3/2017 | Dintenfass et al. | |
| 2017/0228820 | A1 * | 8/2017 | Rohn | G06Q 40/03 |
| 2018/0063125 | A1 | 3/2018 | Bryant | |
| 2018/0075527 | A1 * | 3/2018 | Nagla | G06F 21/6218 |
| 2018/0122004 | A1 | 5/2018 | Stewart | |
| 2018/0276666 | A1 | 9/2018 | Haldenby et al. | |
| 2020/0252408 | A1 | 8/2020 | Bankston | |
| 2020/0286400 | A1 * | 9/2020 | Jackson | G16H 10/60 |
| 2020/0349641 | A1 * | 11/2020 | Fidanza | G06N 3/09 |
| 2021/0073808 | A1 * | 3/2021 | Gu | G06Q 20/3221 |
| 2021/0158437 | A1 * | 5/2021 | Ghamsari | G06Q 40/04 |
| 2021/0182914 | A1 * | 6/2021 | Koch | G08B 13/246 |
| 2021/0233165 | A1 | 7/2021 | Gupta | |
| 2021/0241239 | A1 | 8/2021 | Ferguson | |
| 2021/0256536 | A1 * | 8/2021 | Abdelsamie | G06Q 30/018 |
| 2022/0222677 | A1 | 7/2022 | Nyamwange | |
| 2022/0245656 | A1 * | 8/2022 | Leach | G06Q 30/0234 |
| 2022/0245721 | A1 | 8/2022 | Horesh | |
| 2023/0020845 | A1 * | 1/2023 | Balaji | H04L 63/107 |
| 2023/0147228 | A1 * | 5/2023 | Letayf | G06Q 30/0641 705/26.61 |
| 2023/0368290 | A1 * | 11/2023 | Peters | G06Q 40/03 |

* cited by examiner

SYSTEMS AND METHODS FOR CONTINUOUS EVALUATION OF CUSTOMER CREDIT

BACKGROUND

Existing methods of evaluation credit scores are often opaque to customers, and customers may feel they have little control over decisions involving credit. The effects of actions such as checking a credit score, requesting a line of credit, and the like may be gated by processes that are difficult for customers to determine, and this situation may decrease a customer's willingness to access certain financial services.

BRIEF SUMMARY

Traditionally, customers must build credit through partnership with certain financial institutions. Access to these financial institutions may be difficult or, in some situations and for some customers, impossible. This makes it difficult, for example, for immigrants to the United States or individuals primarily engaged in informal economies to build credit worthiness. Furthermore, Know Your Customer (KYC) regulations may be difficult to fulfil for such customers, causing further difficulty in interacting with some financial institutions. KYC may include certain obligations of financial institutions to assess customer risk and maintain a high degree of confidence in a customer's identity.

Credit scores may depend on multiple factors including payment history, amount of debt, credit history length, and the like. The regulations and factors involved in credit score calculation may be opaque for customers, as described previously. Inquiries into credit score may not always be possible or expedient, and the information provided by the credit score may be difficult to interpret. Without an easily interpretable explanation, customers may have a difficult time improving their credit score, and may have difficulty accessing certain financial services.

In contrast to these conventional techniques for determining credit, example embodiments described herein allow customers to build credit using portable data, rather than strictly through financial institutions. Example embodiments enable the collection of data, and may provide an application programming interface (API) to allow for portability of financial data. In this way, customers can use transaction histories and other financial data to support KYC and credit worthiness decisions through the use of their portable data.

Example embodiments may receive historical customer financial data, and use the information to generate a user credit profile. The user credit profile may be continuously updated as real-time customer financial data is received. The API may be accessed upon receiving a request for credit data from a financial institution, which may trigger the transfer of credit data, which may include select transactions and documents in such a way that the customer's data is kept secure by the financial institution only accessing needed documents, not the entire profile.

Accordingly, the present disclosure sets forth systems, methods, and apparatuses that improve the evaluation of customer credit within the technical fields of cyber and data security and electronic transactions. There are many advantages of these and other embodiments described herein. For instance, customers may find a transparent way to receive real-time information on their credit scores, including ways their actions may impact their credit scores. By gaining confidence and understanding in the credit evaluation process, customers may feel more confident in accessing certain financial services, such as opening accounts and applying for loans. In addition, example embodiments further improve the technical fields of cyber and data security and electronic transactions by providing an API that enables portable data access. The API may enable customers to carry data to different locales, across institutions, or the like, improving access to financial services. Finally, example embodiments may improve the technical field of quantitative finance. By providing access to real-time data, more advanced studies may be performed and more accurate conclusions may be drawn from credit data and customer transaction profiles.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
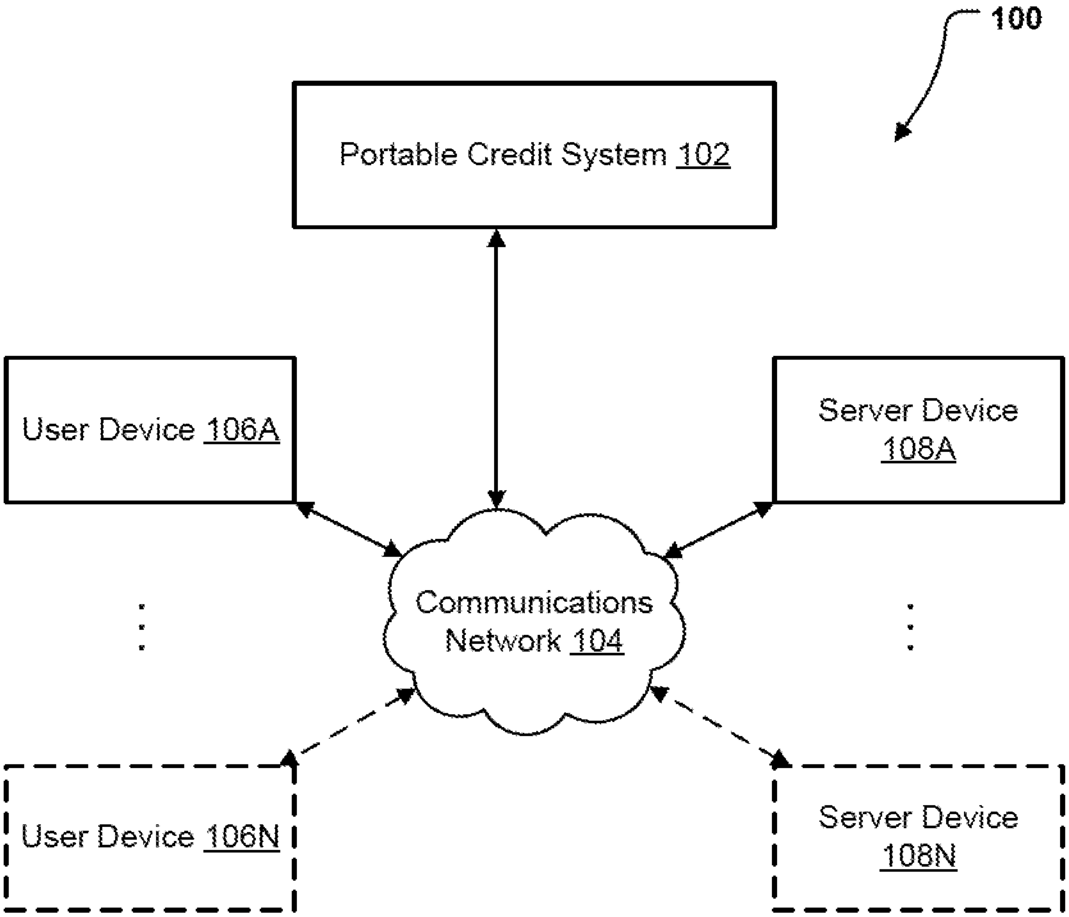
FIG. 1 illustrates a system in which some example embodiments may be used in establishing and maintaining a portable dataset for credit evaluation.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "historical customer financial data" refers to data that may include activities of a customer that are pertinent to one or more eligibility determinations for a customer. For example, financial transaction information, debt, income, assets, location, residence, employment, and the like may all be included in historical customer financial data. The historical customer financial data may be structured, for example, to be read by an application programming interface (API), or the historical customer financial data may be raw data that may require additional processing and/or filtering.

The term "user credit profile" refers to a data structure comprising financial information. In some embodiments, the user credit profile may be further configured to process the customer financial data, such as historical customer financial data, to evaluate an eligibility determination of a customer. The eligibility determination may include, for example, a credit worthiness or credit score, or eligibility to access certain regulated financial services such as opening a bank account. Example determinations of eligibility may be represented as a binary value, indicating eligibility or ineligibility, a single numerical value, such as a score, probability, or risk associated with an eligibility determination, or a multi-factor representation, such as a vector of scores. In some embodiments, the user credit profile may include a data model to analyze input data to calculate the one or more eligibility determinations. In some embodiments, the data model may be a neural network or other machine learning model.

The term "real-time customer financial data" refers to data that include activities of a customer captured by circuitry at the time of the transaction, where the activities are pertinent to one or more eligibility determinations for a customer. For example, financial transaction information, debt, income, assets, location, residence, employment, and the like may all be included in real-time customer financial data. In a similar way as historical customer financial data, the real-time customer financial data may be structured, for example, to be read by an application programming interface (API), or the historical customer financial data may be raw data that may require additional processing and/or filtering. In some embodiments, the historical customer financial data and/or the real-time customer financial data may include recorded cash transactions. For example, cash transactions may be recorded by a mobile device, either by user input, attached cameras or other hardware, or other means. In some embodiments, the historical customer financial data and/or the real-time customer financial data may include electronic transactions. For example, peer-to-peer transaction services may interface to provide real-time customer financial data in a structured format.

The term "credit data" refers to a data structure configured to encapsulate a subset of the information of a user credit profile. For example, a user credit profile may have sensitive information including financial transactions, employment records, or the like, and credit data may include only derived data that indicates a measure of creditworthiness based on the financial transactions and employment records. In some embodiments, the credit data may include redacted versions of financial transactions, employment records, or the like, and may not contain a determination of eligibility. In some embodiments, the credit data may include a preliminary determination of eligibility, or a final determination of eligibility. For example, a user device may collect information in the user credit profile, and provide an encapsulated subset of the information to a server device as credit data. The server device may then validate the credit data and make a credit determination. In the same example, the user device may also use the user profile data and/or credit data to create a preliminary eligibility determination, which may be displayed to the user without requiring access by a server device.

The term "phased loan" refers to a line of credit that includes one or more phased loan tiers. The phased loan tiers may each have certain properties, for example, interest rates, principal amounts, repayment period, or the like. In some embodiments, the phased loan tiers may also each have certain requirements of creditworthiness. In some embodiments, the phased loan tiers may have requirements based on repayment of other loan tiers. For example, a phased loan may include a $100 tier and a $200 tier. Accessing the $200 tier may require successfully meeting the minimum payment on the $100 tier for a period of one month.

The term "classifier model" refers to a statistical model that is configured to describe parameters, hyper-parameters, and/or stored operations of a model to process a set of context-based testing scenario data to classify user credit profile data. In some embodiments, the classifier model is a trained machine learning model. In particular, the classifier model may be a neural network (e.g., feedforward artificial neural network (ANN), multilayer perceptron (MLP), attention-based models, etc.) and/or a classification machine learning model (e.g., random forest, etc.). The classifier model may be trained based at least in part on user credit profile data. Alternatively, the classifier model may be a rules-based model configured to follow a defined set of rules and/or operations to classify customer financial data as fraudulent or non-fraudulent. In some embodiments, the classifier model may be a hybrid model which uses both machine learning model techniques and rules-based model techniques. For example, the classifier model may be configured to evaluate whether given financial transaction data is compatible with rules or requirements by a particular embodiment. If the classifier model identifies one or more incompatibilities or inferred mismatches between user credit profile data and a requirement for the embodiment, the classifier model may address the mismatch between the current configuration and the required configuration as required by the embodiment, either via machine learning techniques or via a rules-based model.

System Architecture

Example embodiments described herein may be implemented using any of a variety of computing devices or servers. To this end, FIG. 1 illustrates an example environment 100 within which various embodiments may operate. As illustrated, a portable credit system 102 may receive and/or transmit information via communications network 104 (e.g., the Internet) with any number of other devices, such as one or more of user devices 106A-106N and/or server devices 108A-108N.

The portable credit system 102 may be implemented as one or more computing devices or servers, which may be composed of a series of components. Particular components of the portable credit system 102 are described in greater detail below with reference to apparatus 200 in connection with FIG. 2A and apparatus 250 in connection with FIG. 2B.

The one or more user devices 106A-106N and the one or more server devices 108A-108N may be embodied by any computing devices known in the art. The one or more user devices 106A-106N and the one or more server devices 108A-108N need not themselves be independent devices, but may be peripheral devices communicatively coupled to other computing devices.

Example Implementing Apparatuses

Figure 2A:
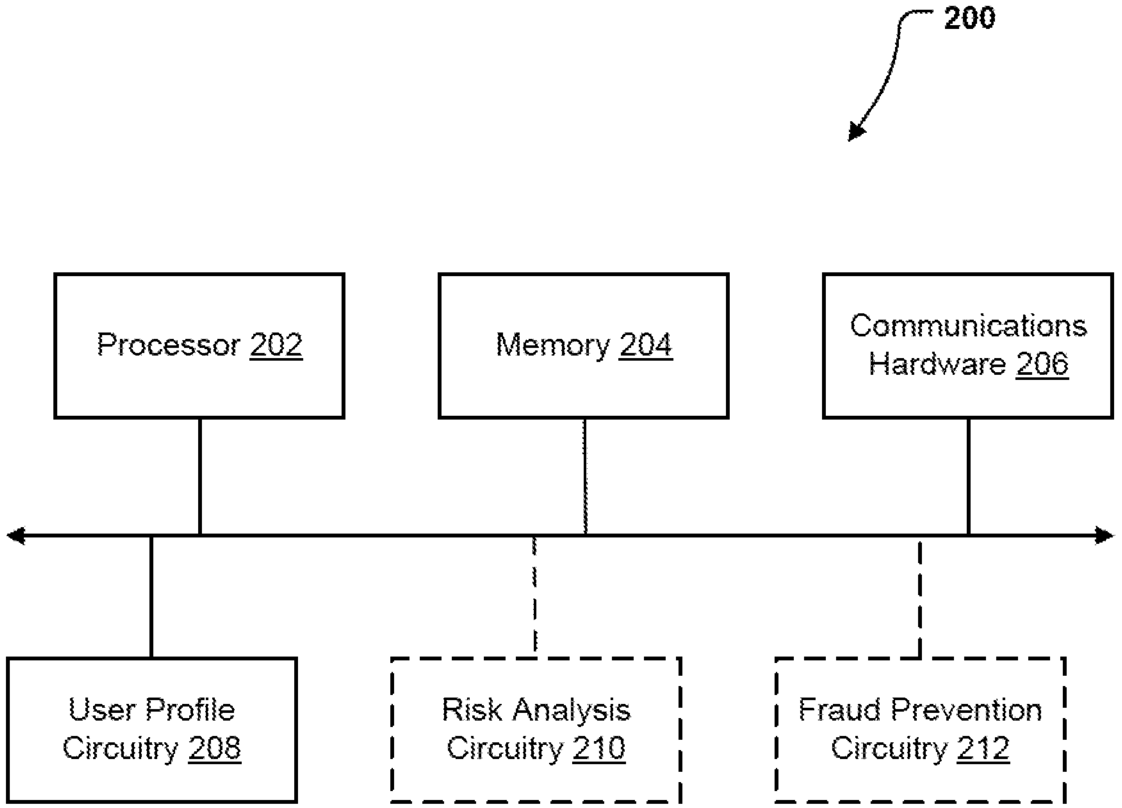
FIG. 2A illustrates a schematic block diagram of example circuitry embodying a user device that may perform various operations in accordance with some example embodiments described herein.
Figure 2B:
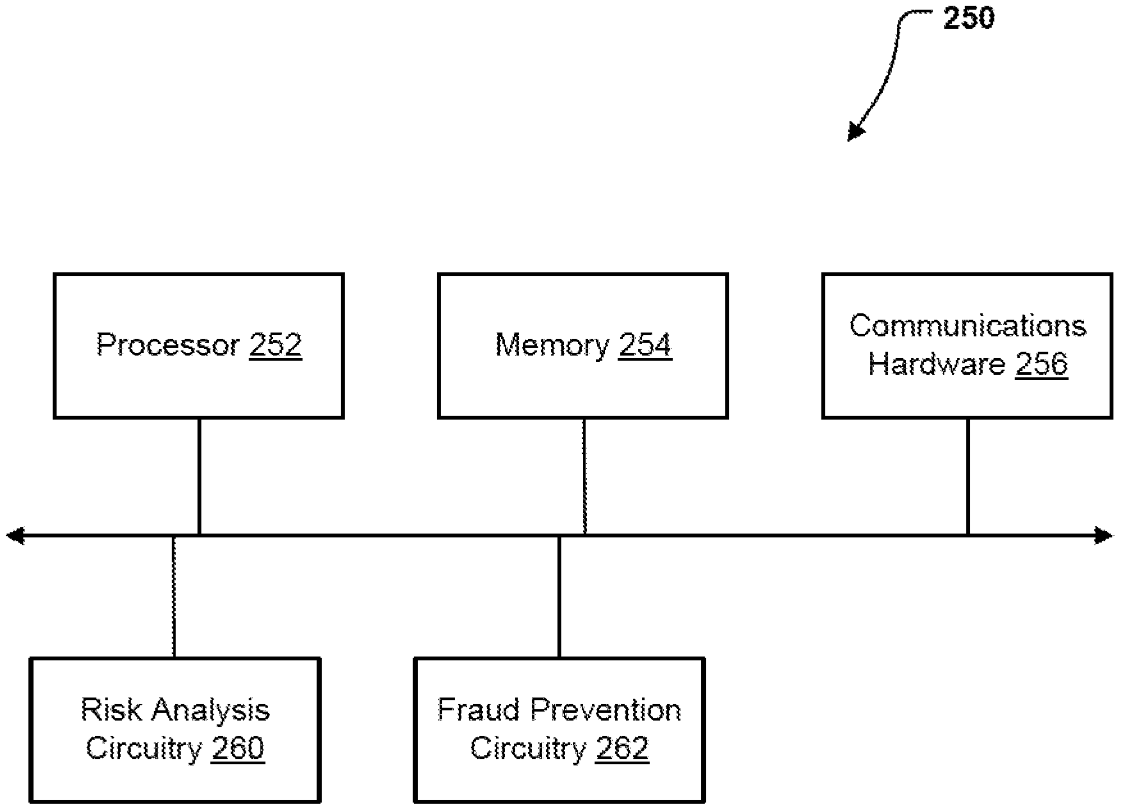
FIG. 2B illustrates a schematic block diagram of example circuitry embodying a server device that may perform various operations in accordance with some example embodiments described herein.

The portable credit system 102 (described previously with reference to FIG. 1) may be embodied by one or more computing devices or servers, shown as apparatus 200 in FIG. 2A. Alternatively, the portable credit system 102 may be embodied by the one or more computing devices or servers shown as apparatus 250 in FIG. 2B, and the apparatus 200 may embody a user device (e.g., any of the user devices 106A through 106N). The apparatus 200 may be configured to execute various operations described above in connection with FIG. 1 and below in connection with FIGS. 3-7. As illustrated in FIG. 2A, the apparatus 200 may include processor 202, memory 204, communications hardware 206, user profile circuitry 208, risk analysis circuitry 210, and fraud prevention circuitry 212, each of which will be described in greater detail below. In some example embodiments described below, the portable credit system 102, embodied by the apparatus 200, may be a user device (including portable devices such as mobile phones, tablets, laptop computers, or the like) that is associated with the user, rather than a remote server that is not associated to a particular user.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a user profile circuitry 208 that creates and maintains a user credit profiles. The user profile circuitry 208 may utilize processor 202, memory 204, or any other hardware component included in the apparatus 200 to perform these operations, as described in connection with FIGS. 3-7 below. The user profile circuitry 208 may further utilize communications hardware 206 to gather data from a variety of sources (e.g., user device 106A through user device 106N, as shown in FIG. 1), and/or exchange data with a user, and in some embodiments may utilize processor 202 and/or memory 204 to manage user credit profiles.

In addition, the apparatus 200 further comprises a risk analysis circuitry 210 that analyzes transaction information to evaluate risk. The risk analysis circuitry 210 may utilize processor 202, memory 204, or any other hardware component included in the apparatus 200 to perform these operations, as described in connection with FIGS. 3-7 below. The risk analysis circuitry 210 may further utilize communications hardware 206 to gather data from a variety of sources (e.g., user device 106A through user device 106N, as shown in FIG. 1), and/or exchange data with a user, and in some embodiments may utilize processor 202 and/or memory 204 to evaluate risk.

Further, the apparatus 200 further comprises a fraud prevention circuitry 212 that detects and reports fraudulent activity. The fraud prevention circuitry 212 may utilize processor 202, memory 204, or any other hardware component included in the apparatus 200 to perform these operations, as described in connection with FIGS. 3-7 below. The fraud prevention circuitry 212 may further utilize communications hardware 206 to gather data from a variety of sources (e.g., user device 106A through user device 106N, as shown in FIG. 1), and/or exchange data with a user, and in some embodiments may utilize processor 202 and/or memory 204 to detect fraud.

Although components 202-212 are described in part using functional language, it will be understood that the particular implementations necessarily include the use of particular hardware. It should also be understood that certain of these components 202-212 may include similar or common hardware. For example, the user profile circuitry 208, risk analysis circuitry 210, and fraud prevention circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the user profile circuitry 208, risk analysis circuitry 210, and fraud prevention circuitry 212 may leverage processor 202, memory 204, or communications hardware 206 as described above, it will be understood that any of user profile circuitry 208, risk analysis circuitry 210, and fraud prevention circuitry 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that user profile circuitry 208, risk analysis circuitry 210, and fraud prevention circuitry 212 comprise particular machinery designed for performing the functions described herein in connection with such elements of apparatus 200.

As illustrated in FIG. 2A, an apparatus 250 is shown that represents an example portable credit system 102 or an example server device (e.g., any of the server devices 108A-108N). The apparatus 250 includes processor 252, memory 254, communications hardware 256, risk analysis circuitry 260, and fraud prevention circuitry 262, each of which is configured to be similar to the similarly named components described above in connection with FIG. 2A. The risk analysis circuitry 260 and/or fraud prevention circuitry 262 may utilize processor 252, memory 254, or any other hardware component included in the apparatus 250 to perform these operations, as described in connection with FIGS. 3-7 below. The risk analysis circuitry 260 and/or fraud prevention circuitry 262 may further utilize communications hardware 256, or may otherwise utilize processor 252 and/or memory 254 to perform operations described in connection with FIGS. 3-7 below.

In some embodiments, various components of the apparatuses 200 and 250 may be hosted remotely (e.g., by one or more cloud servers) and thus need not physically reside on the corresponding apparatus 200 or 250. For instance, some components of the apparatus 200 may not be physically proximate to the other components of apparatus 200. Similarly, some or all of the functionality described herein may be provided by third party circuitry. For example, a given apparatus 200 or 250 may access one or more third party circuitries in place of local circuitries for performing certain functions.

As will be appreciated based on this disclosure, example embodiments contemplated herein may be implemented by an apparatus 200 or 250. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2A or apparatus 250 as described in FIG. 2B, that loading the software instructions onto a computing device or apparatus produces a special-purpose machine comprising the means for implementing various functions described herein.

Having described specific components of example apparatuses 200 and 250, example embodiments are described below in connection with a series of flowcharts.

Example Operations

Turning to FIGS. 3-6, example flowcharts are illustrated that contain example operations implemented by example embodiments described herein. The operations illustrated in FIGS. 3-6 may, for example, be performed by the portable credit system 102 shown in FIG. 1, which may in turn be embodied by an apparatus 200, which is shown and described in connection with FIG. 2A. To perform the operations described below, the apparatus 200 may utilize one or more of processor 202, memory 204, communications hardware 206, user profile circuitry 208, Risk analysis circuitry 210, and/or any combination thereof. It will be understood that user interaction with the portable credit system 102 may occur directly via communications hardware 206, or may instead be facilitated by a separate user device 106, as shown in FIG. 1, and which may have similar or equivalent physical componentry facilitating such user interaction.

Meanwhile, certain operations described in connection with FIGS. 3-6 may be performed by apparatus 250, which may utilize one or more of the processor 252, memory 254, communications hardware 256, risk analysis circuitry 260, fraud prevention circuitry 262, and/or any combination thereof.

Figure 3:
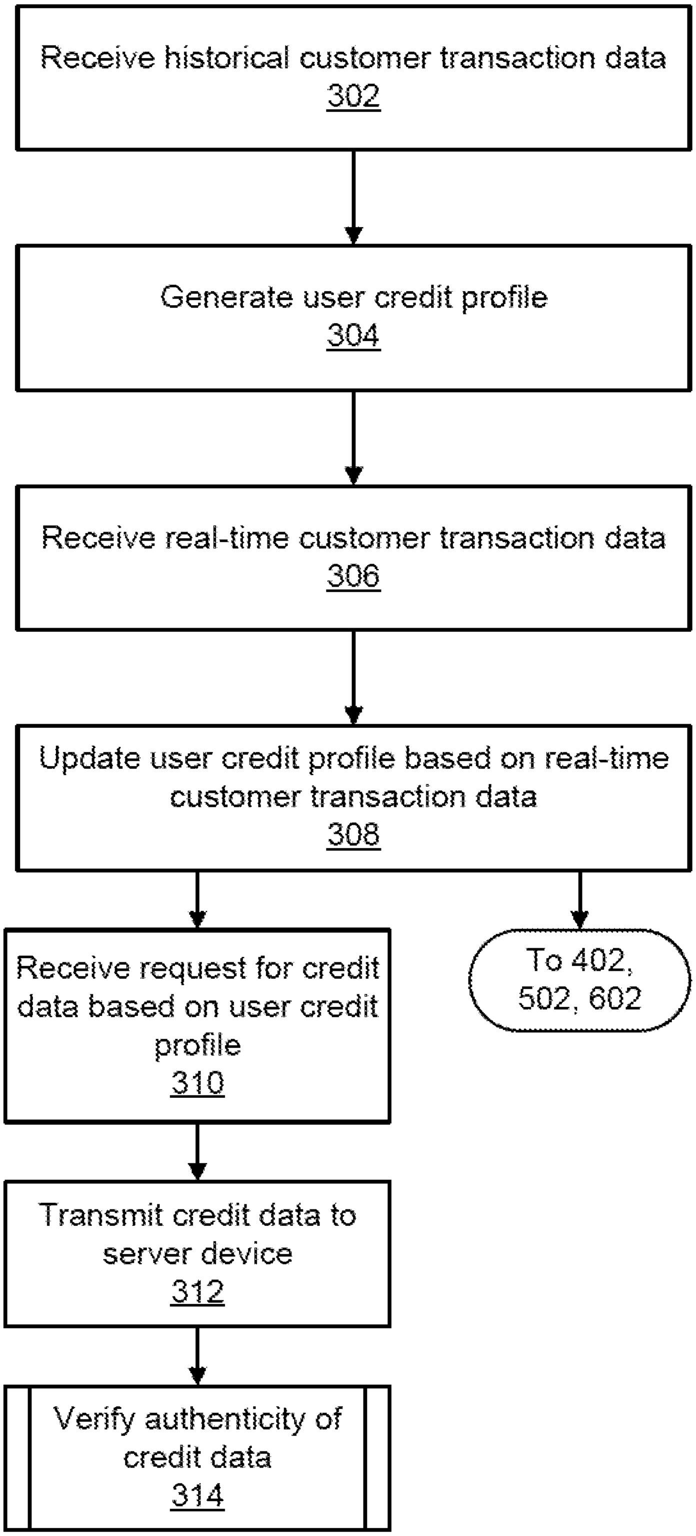
FIG. 3 illustrates an example flowchart for providing portable credit data via an API, in accordance with some example embodiments described herein.

Turning first to FIG. 3, example operations are shown for providing portable credit data via an API. As shown by operation 302, the apparatus 200 includes means, such as processor 202, memory 204, communications hardware 206, or the like, for receiving historical customer financial data. In some embodiments, the apparatus 250 may include means, such as processor 252, memory 254, communications hardware 256, or the like, for receiving historical customer financial data as shown by operation 302. The historical customer financial data may include activities of a customer that are pertinent to one or more eligibility determinations for a customer. For example, financial transaction information, debt, income, assets, location, residence, employment, and the like may all be included in historical customer financial data. The historical customer financial data may be structured, for example, to be read by an application programming interface (API), or the historical customer financial data may be raw data that may require additional processing and/or filtering.

The communications hardware 206 may receive the historical customer financial data directly by attached input/output hardware, or via a network device. In an embodiment in which the communications hardware 206 receives the historical customer financial data via a network device, the historical customer financial data may be transmitted over communications network 104 from one of the user devices 106A-106N or server devices 108A-108N. In some embodiments, the historical customer financial data may be retrieved from storage such as memory 204, or remote storage via network device. In some embodiments, certain financial transaction data may be structured and interpreted as loans, payments for services or goods, or other categories. The categorization of certain financial transactions as loans may relate to the impact of the transaction on the user credit profile.

The historical customer financial data received in example operation 302 may be received by the portable credit system 102, embodied by apparatus 200. In some embodiments, a separate user device 106A through user device 106N may be configured to receive the historical customer financial data, which may relay the historical customer financial data to the apparatus 200. In some embodiments, a remote server device 108A through server device 108N may receive the historical customer financial data, and in some embodiments, may further perform operation 304 described below, before relaying information to the portable credit system 102. In the examples described here, the portable credit system 102 will be understood to be a user device which may store data without reliance on the one or more server devices 108A-108N, whether operation 302 and operation 304 are performed locally by the portable credit system 102 or remotely on the one or more server devices 108A-108N.

As shown by operation 304, the apparatus 200 includes means, such as processor 202, memory 204, communications hardware 206, user profile circuitry 208, or the like, for generating a user credit profile based on the historical customer financial data. The user credit profile may be a data structure comprising financial information. In some embodiments, the user credit profile may be further configured to process the customer financial data, such as historical customer financial data, to evaluate an eligibility determination of a customer. The eligibility determination may include, for example, a credit worthiness or credit score, or eligibility to access certain regulated financial services such as opening a bank account. Example determinations of eligibility may be represented as a binary value, indicating eligibility or ineligibility, a single numerical value, such as a score, probability, or risk associated with an eligibility determination, or a multi-factor representation, such as a vector of scores. In some embodiments, the user credit profile may include a data model to analyze input data to calculate the one or more eligibility determinations. In some embodiments, the data model may be a neural network or other machine learning model.

The user profile circuitry 208 may process the historical customer financial data to create the user credit profile by first cleaning, infilling, formatting, or otherwise preparing the historical customer financial data to be processed. In some embodiments, certain aspects of the historical customer financial data may be discarded to simplify the determination of the user credit profile. In some embodiments, remote devices, such as one or more of the server devices 108A-108N may be contacted to retrieve information, request permission, or perform other operations. In some embodiments, the creation of the user credit profile may not involve any outside circuitry and may be fully performed by connected circuitry of the apparatus 200. The user credit profile may be stored in non-volatile memory 204 for further update and/or retrieval at later times.

As shown by operation 306, the apparatus 200 includes means, such as processor 202, memory 204, communications hardware 206, or the like, for receiving real-time customer financial data. Real-time customer financial data may include activities of a customer captured by circuitry at the time of the transaction, where the activities are pertinent to one or more eligibility determinations for a customer. For example, financial transaction information, debt, income, assets, location, residence, employment, and the like may all be included in real-time customer financial data. In a similar way as historical customer financial data, the real-time customer financial data may be structured, for example, to be read by an application programming interface (API), or the historical customer financial data may be raw data that may require additional processing and/or filtering. In some embodiments, the historical customer financial data and/or the real-time customer financial data may include recorded cash transactions. For example, cash transactions may be recorded by a mobile device, either by user input, attached cameras or other hardware, or other means. In some embodiments, the historical customer financial data and/or the real-time customer financial data may include electronic transactions. For example, peer-to-peer transaction services may interface to provide real-time customer financial data in a structured format.

The communications hardware 206 may receive the real-time customer financial data directly by attached input/output hardware, or via a network device. In an embodiment in which the communications hardware 206 receives the real-time customer financial data via a network device, the real-time customer financial data may be transmitted over communications network 104 from one of the user devices 106A-106N or server devices 108A-108N. In some embodiments, the real-time customer financial data may be retrieved from storage such as memory 204, or remote storage via network device. As described in examples above, real-time customer financial data may be received from sources including cash transactions or electronic payments, including payments between two users. The communications hardware 206 may use a variety of applications and hardware to receive real-time customer financial data. In some embodiments, certain transactions may be structured and interpreted as loans, payments for services or goods, or other categories. The categorization of certain financial transactions as loans may relate to the impact of the transaction on the user credit profile.

The real-time customer financial data received in example operation 306 may be received by the portable credit system 102, embodied by apparatus 200. In some embodiments, a separate user device 106A through user device 106N may be configured to receive the real-time customer financial data, which may relay the real-time customer financial data to the apparatus 200. In some embodiments, as described previously, a remote server device 108A through server device 108N may receive the historical customer financial data, and in some embodiments, may further perform operation 304 described below, before relaying information to the portable credit system 102. In the examples described here, the portable credit system 102 will be understood to be a user device which may store data without reliance on the one or more server devices 108A-108N, whether operation 302 and operation 304 are performed locally by the portable credit system 102 or remotely on the one or more server devices 108A-108N.

As shown by operation 308, the apparatus 200 includes means, such as processor 202, memory 204, communications hardware 206, user profile circuitry 208, or the like, for updating the user credit profile based on the real-time customer financial data. The user profile circuitry 208 may process the real-time customer financial data to update the user credit profile by first cleaning, infilling, formatting, or otherwise preparing the real-time customer financial data to be processed. In some embodiments, certain aspects of the real-time customer financial data may be discarded to simplify the determination of the user credit profile. In some embodiments, remote devices, such as one or more of the server devices 108A-108N may be contacted to retrieve information, request permission, or perform other operations. In some embodiments, the updating and/or modification of the user credit profile may not involve any outside circuitry and may be fully performed by connected circuitry of the apparatus 200. The user credit profile may be stored in non-volatile memory 204 for further update and/or retrieval at later times.

As shown by operation 310, the apparatus 200 includes means, such as processor 202, memory 204, communications hardware 206, or the like, for receiving a request for credit data from one of server device 108A through server device 108N, where the credit data is based on the user credit profile. The credit data may be a data structure configured to encapsulate a subset of the information of a user credit profile. For example, a user credit profile may have sensitive information including financial transactions, employment records, or the like, and credit data may include only derived data that indicates a measure of creditworthiness based on the financial transactions and employment records. In some embodiments, the credit data may include redacted versions of financial transactions, employment records, or the like, and may not contain a determination of eligibility. In some embodiments, the credit data may include a preliminary determination of eligibility, or a final determination of eligibility. For example, a user device may collect information in the user credit profile, and provide an encapsulated subset of the information to a server device as credit data. The server device may then validate the credit data and make a credit determination. In the same example, the user device may also use the user profile data and/or credit data to create a preliminary eligibility determination, which may be displayed to the user without requiring access by a server device.

The communications hardware 206 may receive the request for credit data directly by attached input/output hardware, or via a network device. In an embodiment in which the communications hardware 206 receives the request for credit data via a network device, the request for credit data may be transmitted over communications network 104 from one of the user devices 106A-106N or server devices 108A-108N. The request for credit data may be received via an API, which may be facilitated by a network device of the communications hardware 206 and/or by processor 202 while executing another application on the apparatus 200 (e.g., instructions stored in volatile memory 204). The request for credit data may be formatted to interface to a particular API of the portable credit system 102, enabling secure and efficient transmission of the credit data. In some embodiments, the request for credit data may be encrypted and/or signed by one of the requesting server devices 108A through 108N.

As shown by operation 312, the apparatus 200 includes means, such as processor 202, memory 204, communications hardware 206, or the like, for transmitting the credit data to one of server device 108A through server device 108N. In some embodiments, the portable credit system 102 may be embodied by apparatus 250, and the apparatus 250 may receive the credit data from one of user device 106A through user device 106N. The communications hardware 206 may transmit the credit data directly by attached input/output hardware, or via a network device. In an embodiment in which the communications hardware 206 transmits the credit data via a network device, the credit data may be transmitted over communications network 104 from one of the user devices 106A-106N or server devices 108A-108N. The credit data may be transmitted via an API, which may be facilitated by a network device of the communications hardware 206 and/or by processor 202 while executing another application on the apparatus 200 (e.g., instructions stored in volatile memory 204). The credit data may be formatted to interface to a particular API of the portable credit system 102, enabling secure and efficient transmission of the credit data. In some embodiments, the credit data may be encrypted and/or signed by one of the requesting server devices 108A through 108N.

Figure 7:
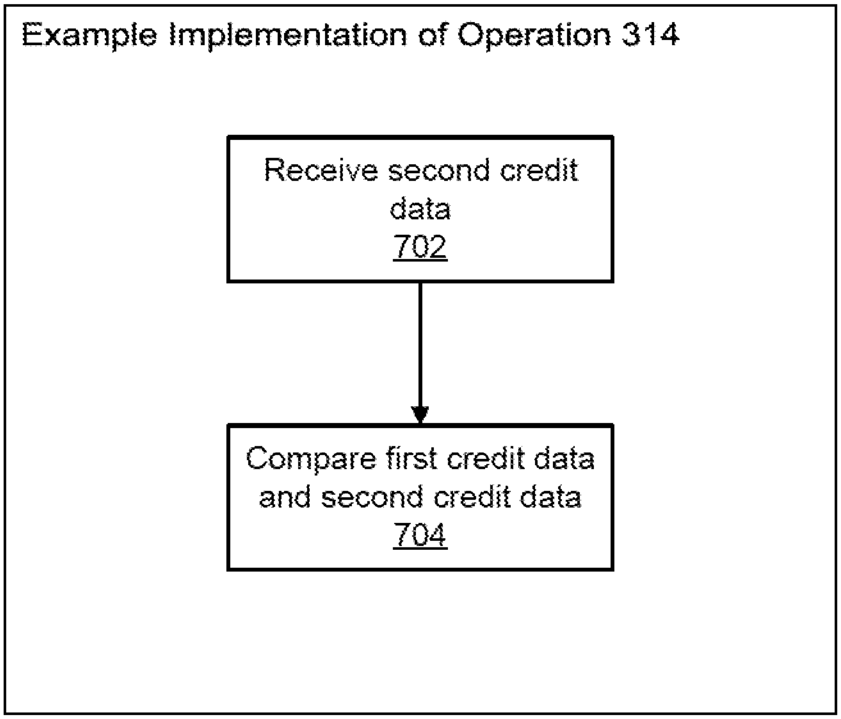
FIG. 7 illustrates an example flowchart for verifying authenticity of credit data, in accordance with some example embodiments described herein.

As shown by operation 314, the apparatus 250 includes means, such as processor 252, memory 254, communications hardware 256, fraud prevention circuitry 262 or the like, for verifying authenticity of the first credit data. FIG. 7 depicts an example implementation of operation 314.

Turning next to FIG. 7 an example implementation of operation 314 is shown. As shown by operation 702, the apparatus 250 includes means, such as processor 252, memory 254, communications hardware 256, or the like, for receiving second credit data. In some embodiments, the apparatus 200 may include means, such as processor 202, memory 204, communications hardware 206, or the like, for receiving historical customer financial data as shown by operation 302. In some embodiments, the second credit data may be received from one of user device 106A through user device 106N. The communications hardware 256 may receive the second credit data directly by attached input/output hardware, or via a network device. In an embodiment in which the communications hardware 256 receives the second credit data via a network device, the credit data may be received via communications network 104 from one of the user devices 106A-106N or server devices 108A-108N. The credit data may be received via an API, which may be facilitated by a network device of the communications hardware 256 and/or by processor 252 while executing another application on the apparatus 250 (e.g., instructions stored in volatile memory 254). The credit data may be formatted to interface to a particular API of the portable credit system 102, enabling secure and efficient transmission of the credit data. In some embodiments, the credit data may be encrypted and/or signed by one of the requesting server devices 108A through 108N. It will be understood that while operation 702 relates to receiving second credit data, several instances of additional credit data may be received from additional sources, such as further user devices 106A-106N.

As shown by operation 704, the apparatus 250 includes means, such as processor 252, memory 254, communications hardware 256, fraud prevention circuitry 262 or the like, for comparing the first credit data and the second credit data. In some embodiments, the apparatus 200 may include means, such as processor 202, memory 204, communications hardware 206, fraud prevention circuitry 212, or the like, for comparing the first credit data and the second credit data. The fraud prevention circuitry 262 may compare details of the first credit data and second credit data to validate and cross-check details of the credit data. Discrepancies between the first credit data and second credit data, for example, may indicate a heightened risk of fraud. In some embodiments, the fraud prevention circuitry 262 may retrieve a stored database from memory 254 including past comparisons of credit data that may be related to the first credit data and/or second credit data. As noted above, it will be understood that additional credit data may be received from additional sources, and additional comparisons may be performed to validate the first credit data, for example, by comparing to second credit data, and one or more additional instances of credit data that may be related to the first credit data. In some embodiments, the fraud prevention circuitry 262 may build a consensus by comparing several instances of credit data which may be checked against the first credit data for risk of fraud. The credit data may be compared by noting dates, times, values, and other details of transactions, loans, or the like to observe any discrepancies between the records of compared credit data. Significant discrepancies may indicate heightened risk of fraud in one or more of the compared credit data instances.

Figure 4:
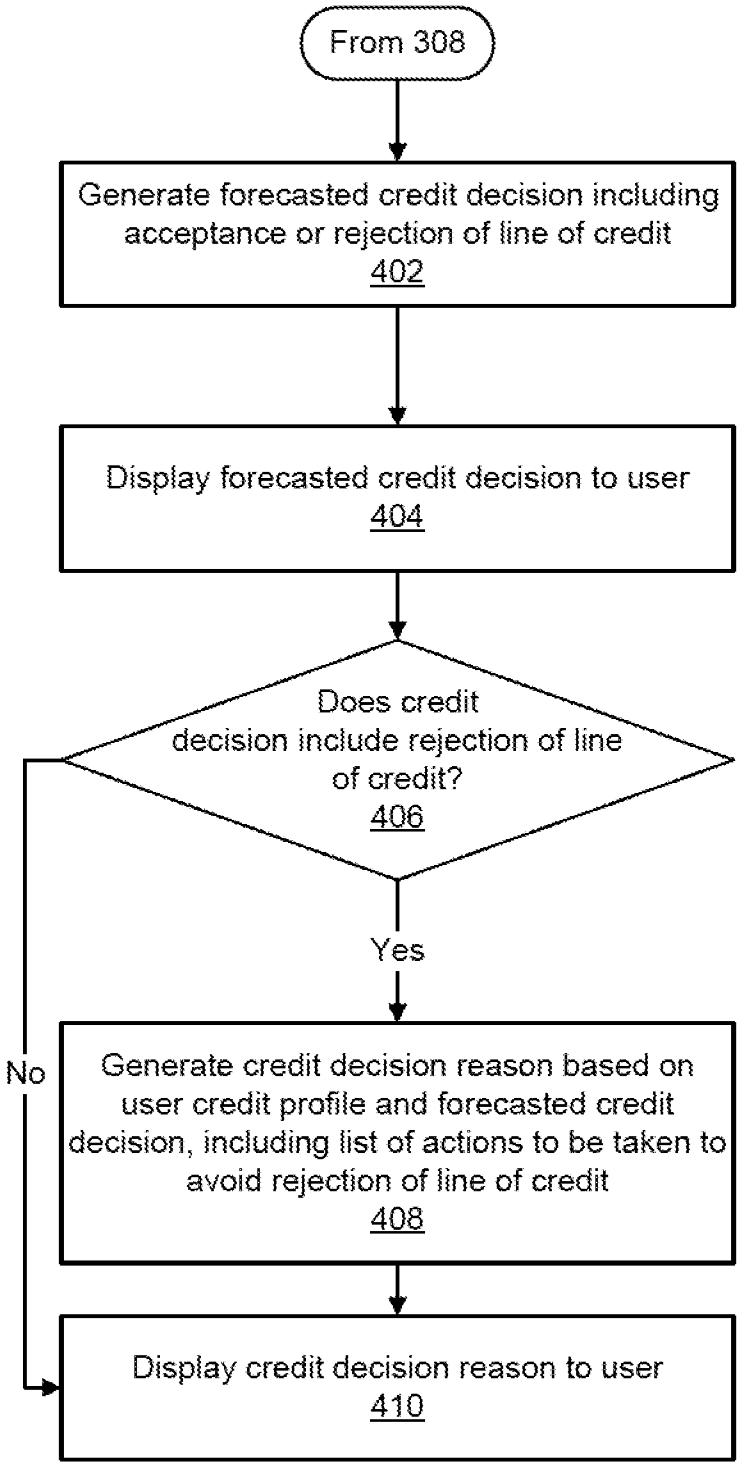
FIG. 4 illustrates an example flowchart for providing a forecasted credit decision, in accordance with some example embodiments described herein.

Turning next to FIG. 4, example operations are shown for providing a forecasted credit decision. As shown by operation 402, the apparatus 250 includes means, such as processor 252, memory 254, communications hardware 256, risk analysis circuitry 260, or the like, for generating a forecasted credit decision based on the user credit profile, where the forecasted credit decision includes an acceptance or a rejection of a line of credit. In some embodiments, the apparatus 200 may include means, such as processor 202, memory 204, communications hardware 206, risk analysis circuitry 210, or the like, for generating the forecasted credit decision. The risk analysis circuitry 260 (or risk analysis circuitry 210) may receive the user credit profile and process the user credit profile through a data model to produce the forecasted credit decision. In some embodiments, the user credit profile may be associated with a data model for generating a forecasted credit decision, and the risk analysis circuitry 260 may access the output of the associated data model. The forecasted credit decision may include all or a subset of the data in the user credit profile to generate the forecasted credit decision. The forecasted credit decision may include a binary outcome, such as an acceptance or a rejection of a particular line of credit. The line of credit may include a principal amount, interest rate, and other parameters. It will be understood that the risk analysis circuitry 260 may generate multiple forecasted credit decisions for multiple lines of credit, thus generating a range of credit available to the user for a given user credit profile.

In some embodiments, the apparatus 200 may receive the forecasted credit decision from a server device (such as one of server devices 108A through 108N). The forecasted credit decision may be generated according to the procedure described above in connection with operation 402, and may be generated by a portable credit system 102 embodied by an apparatus 250.

As shown by operation 404, the apparatus 200 includes means, such as processor 202, memory 204, communications hardware 206, or the like, for displaying the forecasted credit decision to a user. The communications hardware 206 may display the forecasted credit decision (which may be determined during operation 402) to the user by any attached input/output devices of the communications hardware 206, or by transmitting the forecasted credit decision, via a connected network device, over communications network 104 to one of the user devices 106A-106N.

As shown by operation 406, control may depend on whether the forecasted credit decision includes rejecting the line of credit. In an instance in which the forecasted credit decision includes rejecting the line of credit, control may proceed to operation 408. In an instance in which the forecasted credit decision does not include rejecting the line of credit, control may proceed to operation 410.

As shown by operation 408, the apparatus 250 includes means, such as processor 252, memory 254, communications hardware 256, or the like, for generating a credit decision reason based on the user credit profile and the forecasted credit decision. In some embodiments, the apparatus 200 may include means, such as processor 202, memory 204, communications hardware 206, risk analysis circuitry 210, or the like, for generating the credit decision reason. The credit decision reason provides a list of actions to be taken to avoid the rejection of the line of credit. The risk analysis circuitry 260 (or risk analysis circuitry 210) may produce one or more credit decision reasons based on the rejection of the line of credit produced during operation 402. In some embodiments, the risk analysis circuitry 260 may produce one or more credit decision reasons during the generation of the forecasted credit decision. The credit decision reason may depend on the user credit profile and the forecasted credit decision, and may involve a mathematical model that may produce an interpretable reason for the rejection of the line of credit. For example, the risk analysis circuitry 260 may produce a reference user credit profile that would be accepted for a particular line of credit, and summarize the differences between the user credit profile that received a rejection of the line of credit and the reference user credit profile. In some embodiments, simplifications may be made to the list of reasons in order to improve the interpretability of the credit decision reasons. For example, a multi-factor analysis may include several highly correlated reasons for the rejection of a line of credit, and the highly-correlated reasons may be combined numerically to produce a single reason with a more straightforward, user-friendly interpretation.

As shown by operation 410, the apparatus 200 includes means, such as processor 202, memory 204, communications hardware 206, or the like, for displaying the credit decision reason to the user. The communications hardware 206 may display the credit decision reason (which may be determined during operation 408) to the user by any attached input/output devices of the communications hardware 206, or by transmitting the credit decision reason, via a connected network device, over communications network 104 to one of the user devices 106A-106N. It will be understood that, in some embodiments, a plurality of credit decision reasons may be displayed, for example, in configurations where more than one credit decision reason is generated during operation 408.

Figure 5:
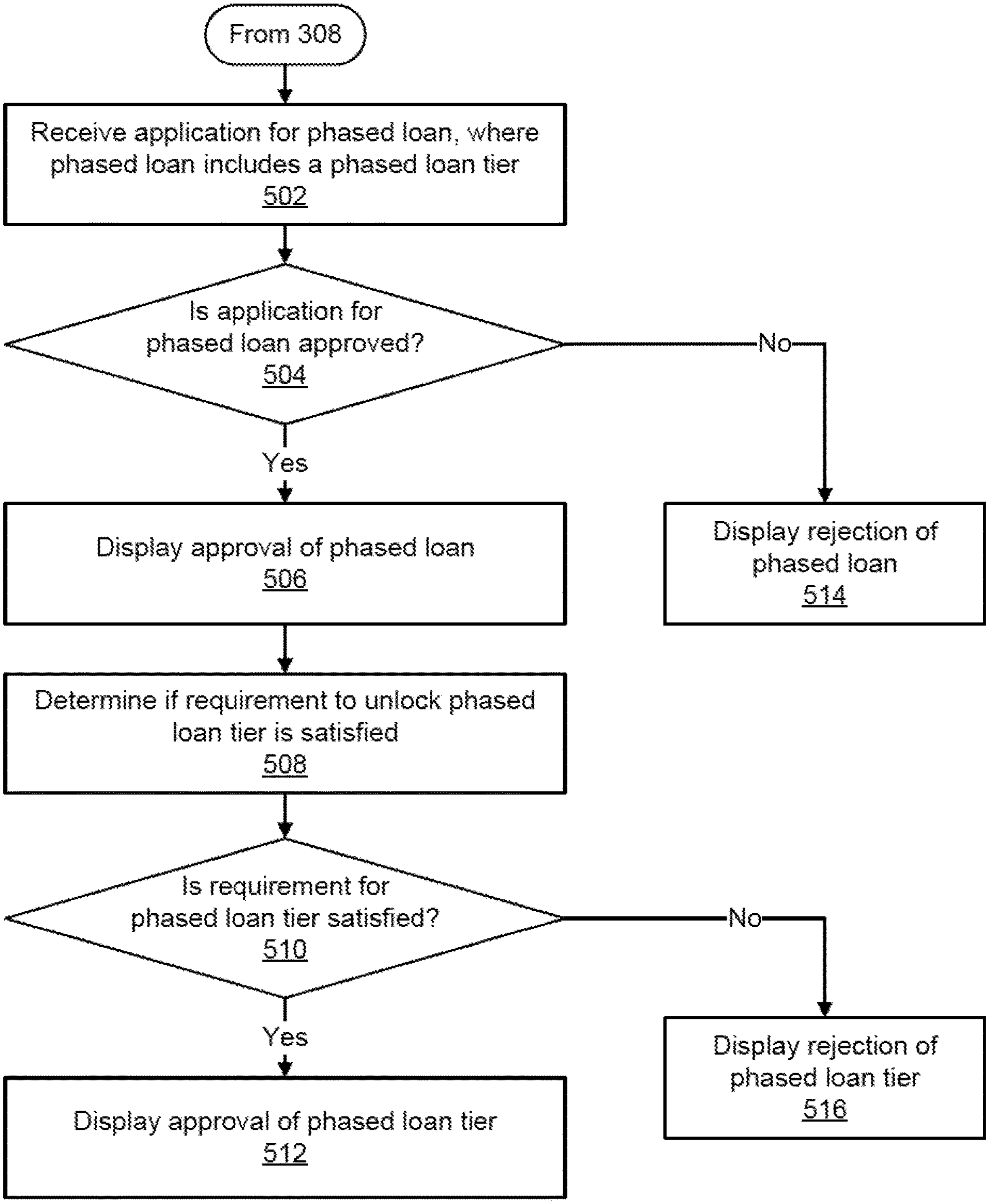
FIG. 5 illustrates an example flowchart for approving a phased loan and a tier of a phased loan, in accordance with some example embodiments described herein.

Turning next to FIG. 5, example operations are shown for approving a phased loan and a tier of a phased loan, in accordance with some example embodiments described herein. As shown by operation 502, the apparatus 250 includes means, such as processor 252, memory 254, communications hardware 256, or the like, for receiving an application for a phased loan, where the phased loan includes a phased loan tier. In some embodiments, the apparatus 200 includes means, such as processor 202, memory 204, communications hardware 206, or the like, for receiving the application for a phased loan. The phased loan may be a line of credit that includes one or more phased loan tiers. The phased loan tiers may each have certain properties, for example, interest rates, principal amounts, repayment period, or the like. In some embodiments, the phased loan tiers may also each have certain requirements of creditworthiness. In some embodiments, the phased loan tiers may have requirements based on repayment of other loan tiers. For example, a phased loan may include a $100 tier and a $200 tier. Accessing the $200 tier may require successfully meeting the minimum payment on the $100 tier for a period of one month. In some embodiments, the phased loan tiers may unlock automatically when requirements of the phased loan tier are satisfied.

The communications hardware 256 may receive the application for the phased loan directly by attached input/output hardware, or via a network device. In an embodiment in which the communications hardware 256 receives the application for the phased loan via a network device, the application for the phased loan may be transmitted over communications network 104 from one of the user devices 106A-106N or server devices 108A-108N. In some embodiments, the application for the phased loan may be retrieved from storage such as memory 254, or remote storage via network device.

As shown by operation 504, control may depend on whether the application for the phased loan is approved. In an instance in which the application for the phased loan is approved, control may proceed to operation 506. In an instance in which the application for the phased loan is not approved, control may proceed to operation 514.

As shown by operation 506, the apparatus 200 includes means, such as processor 202, memory 204, communications hardware 206, or the like, for displaying the approval of the phased loan. The communications hardware 206 may display an indication of the approval of the phased loan (which may be determined externally and received during operation 502) to the user by any attached input/output devices of the communications hardware 206, or by transmitting the credit decision reason, via a connected network device, over communications network 104 to one of the user devices 106A-106N.

As shown by operation 508, the apparatus 250 includes means, such as processor 252, memory 254, communications hardware 256, risk analysis circuitry 260, or the like, for determining, based on the user credit profile, if a requirement to unlock the phased loan tier is satisfied. In some embodiments, the apparatus 200 includes means, such as processor 202, memory 204, communications hardware 206, risk analysis circuitry 210, or the like, for determining if the requirement to unlock the phased loan tier is satisfied. As described above, the phased loan may include one or more phased loan tiers, and the phased loan tiers may have certain requirements, some of which may depend on repayment of other loan tiers. The risk analysis circuitry 260 may interpret the user credit profile, historical customer transaction data and/or real-time customer transaction data. The risk analysis circuitry 260 may analyze the input data to determine if the customer has completed the requirements associated with the phased loan tier. The risk analysis circuitry 260 may reach an approve or deny decision based on comparing the input data to the phased loan tier requirements.

As shown by operation 510, control may depend on whether the requirement to unlock the phased loan tier is satisfied. In an instance in which the requirement to unlock the phased loan tier is satisfied, control may proceed to operation 512. In an instance in which the requirement to unlock the phased loan tier is not satisfied, control may proceed to operation 516.

As shown by operation 512, the apparatus 200 includes means, such as processor 202, memory 204, communications hardware 206, or the like, for displaying the approval of the phased loan tier. The communications hardware 206 may display an indication of the approval of the phased loan tier (which may be determined during operation 508) to the user by any attached input/output devices of the communications hardware 206, or by transmitting the credit decision reason, via a connected network device, over communications network 104 to one of the user devices 106A-106N.

As shown by operation 514, the apparatus 200 includes means, such as processor 202, memory 204, communications hardware 206, or the like, for displaying the rejection of the phased loan. The communications hardware 206 may display an indication of the rejection of the phased loan (which may be determined during operation 504) to the user by any attached input/output devices of the communications hardware 206, or by transmitting the credit decision reason, via a connected network device, over communications network 104 to one of the user devices 106A-106N.

As shown by operation 516, the apparatus 200 includes means, such as processor 202, memory 204, communications hardware 206, or the like, for displaying an indication of the rejection of the phased loan tier. The communications hardware 206 may display the rejection of the phased loan tier (which may be determined during operation 510) to the user by any attached input/output devices of the communications hardware 206, or by transmitting the credit decision reason, via a connected network device, over communications network 104 to one of the user devices 106A-106N.

Figure 6:
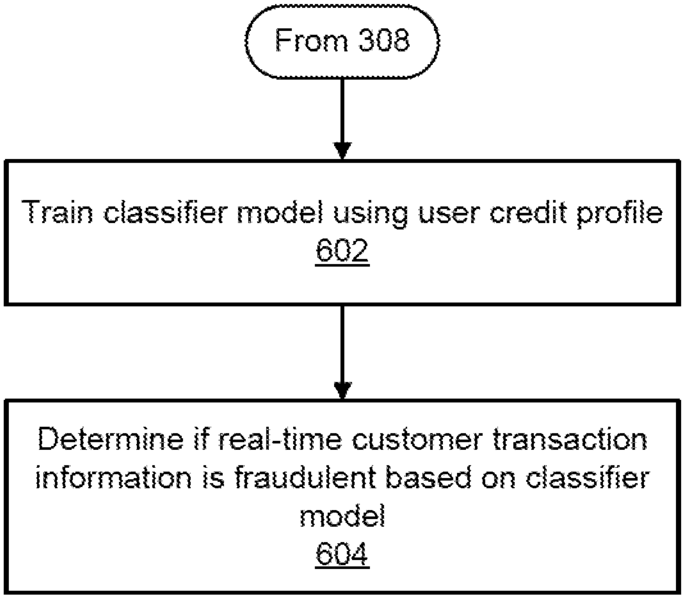
FIG. 6 illustrates an example flowchart for determining fraudulent activity based on a user credit profile, in accordance with some example embodiments described herein.

Turning next to FIG. 6, example operations are shown for determining fraudulent activity based on a user credit profile. As shown by operation 602, the apparatus 200 and/or the apparatus 250 include means, such as processor 202, memory 204, communications hardware 206, fraud prevention circuitry 212, (or corresponding circuitry of apparatus 250) or the like, for training a classifier model using the user credit profile. The fraud prevention circuitry 212 may train the classifier model by fitting the internal parameters of the classifier model to the inputs of the first context-based testing scenario data. The classifier model may be a statistical model that is configured to describe parameters, hyperparameters, and/or stored operations of a model to process a set of context-based testing scenario data to classify user credit profile data. In some embodiments, the classifier model is a trained machine learning model. In particular, the classifier model may be a neural network (e.g., feedforward artificial neural network (ANN), multilayer perceptron (MLP), attention-based models, etc.) and/or a classification machine learning model (e.g., random forest, etc.). The classifier model may be trained based at least in part on user credit profile data. Alternatively, the classifier model may be a rules-based model configured to follow a defined set of rules and/or operations to classify customer financial data as fraudulent or non-fraudulent. In some embodiments, the classifier model may be a hybrid model which uses both machine learning model techniques and rules-based model techniques. For example, the classifier model may be configured to evaluate whether given financial transaction data is compatible with rules or requirements by a particular embodiment. If the classifier model identifies one or more incompatibilities or inferred mismatches between user credit profile data and a requirement for the embodiment, the classifier model may address the mismatch between the current configuration and the required configuration as required by the embodiment, either via machine learning techniques or via a rules-based model.

In some embodiments, the fraud prevention circuitry 212 may clean, format, infill, or otherwise prepare the user credit profile data for training. The fraud prevention circuitry 212 may be configured to train the classifier model using supervised and/or unsupervised learning, may use a hybrid of both approaches, or may use training approaches with reduced levels of user supervision. The fraud prevention circuitry 212 may use the entire dataset of the user credit profile data, or may be configured to divide the data for providing diagnostics, to control for overtraining, or for other reasons.

As shown by operation 604, the apparatus 200 and/or the apparatus 250 include means, such as processor 202, memory 204, communications hardware 206, fraud prevention circuitry 212 (or corresponding circuitry of apparatus 250), or the like, for determining, based on the classifier model, that the real-time customer financial data is fraudulent. The fraud prevention circuitry 212 may provide the real-time customer financial data to the classifier model as input to obtain the classifier output from the classifier model. The classifier model output may be a numerical value related to the probability that financial data is fraudulent or non-fraudulent. In some embodiments, the fraud prevention circuitry 212 may apply a threshold or cutoff value to the classifier output and label outputs as fraudulent or non-fraudulent based on their relation to the threshold value.

FIGS. 3-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations described above in connection with FIGS. 3-6 may be modified or further amplified. Furthermore, in some embodiments, additional optional operations may be included. Modifications, amplifications, or additions to the operations above may be performed in any order and in any combination.

Conclusion

As described above, example embodiments provide methods and apparatuses that enable improved credit determinations with portable data. Example embodiments thus provide tools that overcome the problems faced by customers and financial institutions seeking to accurately determine credit worthiness. By providing an API to allow financial institutions to access credit data directly from the user, customers may voluntarily provide additional information to financial institutions to improve their credit scores. Moreover, embodiments described herein avoid the difficulties associated with determining credit scores through traditional means, which may be opaque and also may not take into account all relevant factors in a customer's financial data (such as peer-to-peer electronic transactions, cash transactions, small business transactions within an informal economy, or the like).

As these examples all illustrate, example embodiments contemplated herein provide technical solutions that solve real-world problems faced during determining customer credit worthiness. And while credit score determinations has been an issue for decades, the rising ubiquity of informal transactions that are not captured by traditional credit evaluation methods point to the necessity to improve the state of the art. At the same time, the improved ability to store data on mobile devices and synchronize data collection with electronic transactions have unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, by communications hardware of a user device, real-time customer financial data associated with a first institution, wherein the real-time customer financial data is structured to be readable by an application programming interface (API) of a user profile circuitry of the user device;

updating, by the user profile circuitry of the user device and based on the real-time customer financial data, a user credit profile stored on the user device, wherein the user credit profile is generated based on historical customer financial data associated with the first institution;

receiving, by the communications hardware of the user device and from a server device associated with a second institution, a request for credit data comprising a measure of creditworthiness, wherein the credit data is based on the user credit profile;

generating, by the user profile circuitry of the user device, the credit data based on the user credit profile;

transmitting, by the communications hardware of the user device, the credit data to the server device;

transmitting, by the communications hardware of the user device, a request to execute a transaction, wherein authorization to execute the transaction is based on comparing the measure of creditworthiness to a requisite measure of creditworthiness;

receiving, by the communications hardware of the user device, an approval to execute the transaction;

causing execution, by the user device, of the transaction;

generating, by risk analysis circuitry and based on the user credit profile, a forecasted credit decision, wherein the forecasted credit decision comprises an acceptance or a rejection of a line of credit;

in an instance in which the forecasted credit decision comprises rejecting the line of credit, generating, by the risk analysis circuitry and based on the user credit profile and the forecasted credit decision, a credit decision reason, wherein the credit decision reason provides a list of actions to be taken to avoid the rejection of the line of credit; and displaying, by the communications hardware of the user device, the forecasted credit decision and the credit decision reason to a user.

2. The method of claim 1, further comprising:

receiving, by the communications hardware, an application for a phased loan, wherein the phased loan comprises a phased loan tier; and in an instance in which the application for the phased loan is approved, displaying, by the communications hardware of the user device, an indication of approval of the phased loan.

3. The method of claim 2, further comprising:

determining, by the risk analysis circuitry and based on the user credit profile, that a requirement to unlock the phased loan tier is satisfied; and in an instance in which the requirement to unlock the phased loan tier is satisfied, displaying, by the communications hardware of the user device, an indication of approval of the phased loan tier.

4. The method of claim 1, further comprising:

determining, by fraud prevention circuitry and based on a classifier model, that the real-time customer financial data is fraudulent.

5. The method of claim 4, further comprising:

training, by the fraud prevention circuitry, the classifier model using the user credit profile.

6. The method of claim 1, wherein at least one of the historical customer financial data or the real-time customer financial data comprise recorded cash transactions.

7. The method of claim 1, wherein at least one of the historical customer financial data or the real-time customer financial data comprise electronic transactions.

8. An apparatus comprising:

communications hardware configured to receive real-time customer financial data associated with a first institution, wherein the real-time customer financial data is structured to be readable by an application programming interface (API) of a user profile circuitry of the apparatus;

the user profile circuitry configured to update, based on the real-time customer financial data, a user credit profile stored on the apparatus, wherein the user credit profile is generated based on historical customer financial data associated with the first institution, wherein the communications hardware is further configured to:

receive, from a server device associated with a second institution, a request for credit data comprising a measure of creditworthiness, wherein the credit data is based on the user credit profile;

generate the credit data based on the user credit profile;

transmit the credit data to the server device;

transmit a request to execute a transaction, wherein authorization to execute the transaction is based on comparing the measure of creditworthiness to a requisite measure of creditworthiness;

receive an approval to execute the transaction; and cause execution of the transaction; and risk analysis circuitry configured to:

generate, based on the user credit profile, a forecasted credit decision, wherein the forecasted credit decision comprises an acceptance or a rejection of a line of credit, and in an instance in which the forecasted credit decision comprises rejecting the line of credit, generate, based on the user credit profile and the forecasted credit decision, a credit decision reason, wherein the credit decision reason provides a list of actions to be taken to avoid the rejection of the line of credit, wherein the communications hardware is further configured to display, at a user device. the forecasted credit decision and the credit decision reason to a user.

9. The apparatus of claim 8, wherein the communications hardware is further configured to:

receive an application for a phased loan, wherein the phased loan comprises a phased loan tier; and in an instance in which the application for the phased loan is approved, display an indication of approval of the phased loan.

10. The apparatus of claim 9, wherein:

the risk analysis circuitry is further configured to determine, based on the user credit profile, that a requirement to unlock the phased loan tier is satisfied;

the communications hardware is further configured to, in an instance in which the requirement to unlock the phased loan tier is satisfied, display an indication of approval of the phased loan tier.

11. The apparatus of claim 8, further comprising:

fraud prevention circuitry configured to determine, and based on a classifier model, that the real-time customer financial data or the user credit profile is fraudulent.

12. The apparatus of claim 11, wherein the fraud prevention circuitry is further configured to train the classifier model using the user credit profile.

13. The apparatus of claim 8, wherein at least one of the historical customer financial data or the real-time customer financial data comprise recorded cash transactions.

14. The apparatus of claim 8, wherein at least one of the historical customer financial data or the real-time customer financial data comprise electronic transactions.

15. A computer program product comprising at least one non-transitory computer-readable storage medium storing software instructions that, when executed, cause an apparatus to:

generate, based on historical customer financial data associated with a first institution, a user credit profile stored on a first device;

receive real-time customer financial data associated with the first institution, wherein the real-time customer financial data is structured to be readable by an application programming interface (API) of a user profile circuitry;

update, based on the real-time customer financial data, the user credit profile stored on the first device;

receive, from a server device associated with a second institution, a request for credit data comprising a measure of creditworthiness, wherein the credit data is based on the user credit profile;

generate the credit data based on the user credit profile;

transmit the credit data to the server device;

transmit a request to execute a transaction, wherein authorization to execute the transaction is based on comparing the measure of creditworthiness to a requisite measure of creditworthiness;

receive an approval to execute the transaction;

cause execution of the transaction;

generate, based on the user credit profile, a forecasted credit decision, wherein the forecasted credit decision comprises an acceptance or a rejection of a line of credit;

in an instance in which the forecasted credit decision comprises rejecting the line of credit, generate, based on the user credit profile and the forecasted credit decision, a credit decision reason, wherein the credit decision reason provides a list of actions to be taken to avoid the rejection of the line of credit; and display, at a user device, the forecasted credit decision and the credit decision reason to a user.

16. The computer program product of claim 15, wherein the software instructions, when executed, further cause the apparatus to:

receive an application for a phased loan, wherein the phased loan comprises a phased loan tier; and in an instance in which the application for the phased loan is approved, display, at the user device, an indication of approval of the phased loan.

17. The computer program product of claim 16, wherein the software instructions, when executed, further cause the apparatus to:

determine, based on the user credit profile, that a requirement to unlock the phased loan tier is satisfied; and in an instance in which the requirement to unlock the phased loan tier is satisfied, display, at the user device, an indication of approval of the phased loan tier.

18. The computer program product of claim 15, wherein the software instructions, when executed, further cause the apparatus to:

determine, based on a classifier model, that the real-time customer financial data is fraudulent.

19. The computer program product of claim 18, wherein the software instructions, when executed, further cause the apparatus to:

train the classifier model using the user credit profile.

20. The computer program product of claim 15, wherein at least one of the historical customer financial data or the real-time customer financial data comprise recorded cash transactions.

* * * * *